US012468939B2

(12) United States Patent
Moon et al.

(10) Patent No.: US 12,468,939 B2
(45) Date of Patent: Nov. 11, 2025

(54) OBJECT DISCOVERY USING AN AUTOENCODER

(71) Applicant: Samsung SDS America, Inc., San Jose, CA (US)

(72) Inventors: Hankyu Moon, San Ramon, CA (US); Heng Hao, San Jose, CA (US); Sima Didari, San Jose, CA (US); Jae Oh Woo, Fremont, CA (US); Patrick David Bangert, Sunnyvale, CA (US)

(73) Assignee: SAMSUNG SDS AMERICA, INC., San Jose, CA (US)

( * ) Notice: Subject to any disclaimer, the term of this patent is extended or adjusted under 35 U.S.C. 154(b) by 1017 days.

(21) Appl. No.: 17/517,313

(22) Filed: Nov. 2, 2021

(65) Prior Publication Data

US 2022/0383105 A1    Dec. 1, 2022

Related U.S. Application Data

(60) Provisional application No. 63/193,972, filed on May 27, 2021.

(51) Int. Cl.
*G06N 3/08*        (2023.01)
*G06F 18/2113*     (2023.01)
*G06F 18/214*      (2023.01)
*G06F 18/22*       (2023.01)

(52) U.S. Cl.
CPC .......... *G06N 3/08* (2013.01); *G06F 18/2113* (2023.01); *G06F 18/2155* (2023.01); *G06F 18/22* (2023.01)

(58) Field of Classification Search
CPC ...... G06N 3/08; G06N 20/00; G06F 18/2113; G06F 18/2155; G06F 18/22
See application file for complete search history.

(56) References Cited

U.S. PATENT DOCUMENTS

2018/0330238 A1* 11/2018 Luciw .................... G06N 3/044

OTHER PUBLICATIONS

Gupta, K., Singh, S., & Shrivastava, A. (2020). PatchVAE: Learning Local Latent Codes for Recognition. arXiv (Cornell University). https://doi.org/10.48550/arxiv.2004.03623 (Year: 2020).*

(Continued)

*Primary Examiner* — Miranda M Huang
*Assistant Examiner* — Victor Adelard Nault
(74) *Attorney, Agent, or Firm* — Sughrue Mion, PLLC (57) ABSTRACT

A problem of supervised learning is overcome by using patches to discover objects in unlabeled training images. The discovered objects are embedded in a pattern space. An AI machine replaces manual entry steps of training with a machine-centric process including clustering in a pixel space, clustering in latent space and building the pattern space based on different losses derived from pixel space clustering and latent space clustering. A distance structure in the pattern space captures the co-occurrence of patterns due to frequently appearing objects in training image data. Embodiments provide image representation based on local image patch naturally handles the position and scale invariance property that is important to effective object detection. Embodiments successfully identifies frequent objects such as human faces, human bodies, animals, or vehicles from unorganized data images based on a small quantity of training images.

22 Claims, 8 Drawing Sheets

(56) References Cited

OTHER PUBLICATIONS

Chen, M., Velasco-Forero, S., Tsang, I., & Tat-Jen Cham. (2015). Objects co-segmentation: Propagated from simpler images. 2015 IEEE International Conference on Acoustics, Speech and Signal Processing (ICASSP), 1682-1686. https://doi.org/10.1109/ICASSP.2015.7178257 (Year: 2015).*

Contrastive learning of global and local features for medical image segmentation with limited annotations. (2020). arXiv (Cornell University). https://doi.org/10.48550/arxiv.2006.10511 (Year: 2020).*

Show, Match and Segment: Joint Weakly Supervised Learning of Semantic Matching and Object Co-segmentation. (2020). arXiv (Cornell University). https://doi.org/10.48550/arxiv.1906.05857 (Year: 2020).*

Sung, K.-K., & Poggio, T. (1998). Example-based learning for view-based human face detection. IEEE Transactions on Pattern Analysis and Machine Intelligence, 20(1), 39-51. https://doi.org/10.1109/34.655648 (Year: 1998).*

Rothe, R., Guillaumin, M., & Van Gool, L. (2015). Non-maximum Suppression for Object Detection by Passing Messages Between Windows. In Computer Vision—ACCV 2014 (vol. 9003, pp. 290-306). Springer International Publishing AG. https://doi.org/10.1007/978-3-319-16865-4_19 (Year: 2015).*

Mohan, A., Papageorgiou, C., & Poggio, T. (2001). Example-based object detection in images by components. IEEE Transactions on Pattern Analysis and Machine Intelligence, 23(4), 349-361. https://doi.org/10.1109/34.917571 (Year: 2001).*

Gao, S., Zhang, Y., Jia, K., Lu, J., & Zhang, Y. (2015). Single Sample Face Recognition via Learning Deep Supervised Autoencoders. IEEE Transactions on Information Forensics and Security, 10(10), 2108-2118. https://doi.org/10.1109/TIFS.2015.2446438 (Year: 2015).*

Guan, J., Zhang, M., & Lu, Z. (2021). Large-Scale Cross-Domain Few-Shot Learning. In Computer Vision—ACCV 2020 (vol. 12624, pp. 474-491). Springer International Publishing AG. https://doi.org/10.1007/978-3-030-69535-4_29 (Year: 2021).*

Amit, R., Mishne, G., & Talmon, R. (2016). Improving resolution in supervised patch-based target detection. 2016 IEEE International Conference on Acoustics, Speech and Signal Processing (ICASSP), 1994-1998. https://doi.org/10.1109/ICASSP.2016.7472026 (Year: 2016).*

Li, Hongliang, and King Ngi Ngan. "A co-saliency model of image pairs." IEEE Transactions on Image Processing 20.12 (2011): 3365-3375. (Year: 2011).*

Rother, Carsten, et al. "Cosegmentation of image pairs by histogram matching-incorporating a global constraint into mrfs." 2006 IEEE Computer Society Conference on Computer Vision and Pattern Recognition (CVPR'06). vol. 1. IEEE, 2006. (Year: 2006).*

Diederik P. Kingma et al., "Auto-Encoding Variational Bayes", Cornell University, arXiv:1312.6114v10, May 1, 2014, 14 pages total, Available at Cornell University archive by URL: https://arxiv.org/abs/1312.6114.

Yuxin Peng et al., "Semi-Supervised Cross-Media Feature Learning With Unified Patch Graph Regularization", IEEE Transactions on Circuits and Systems for Video Technology, vol. 26, No. 3, Mar. 2016, 14 pages total.

* cited by examiner

Inference 2-32

FIG. 5

OBJECT DISCOVERY USING AN AUTOENCODER

CROSS REFERENCE TO RELATED APPLICATION

This application claims benefit of priority of U.S. Provisional Application No. 63/193,972, filed May 27, 2021, the contents of which are hereby incorporated by reference.

FIELD

The present disclosure is related to improving discovery of objects in images in the technology area of artificial intelligence (AI).

BACKGROUND

Locating objects in a scene is an important step in analyzing image content. Analysis of image content may be performed by a computer using AI. In supervised learning of object detection, a detection model is trained with information of object presence in training images. The trained detection model may then be used to infer the presence of objects in unseen images. In practice, some scene analysis AI machines are trained with a manual step of a human being providing labels for different scenes in different training images.

Manual entry is problematic because the manual entry generally requires assigning bounding boxes for all objects in each of many images.

Manual entry is also problematic, because the manual entry is specific to a type of existing known object being searched for.

Manual entry is also problematic because it is characterized by a human-derived error rate, which may be orders of magnitude higher than a machine-based process.

Finding objects without being told how to infer them is a problem of discovery and/or retrieval.

SUMMARY

Embodiments of this application replace a manual step of a person labeling images with an AI machine discovering objects in images; this may also be referred to as retrieval. The discovering makes use of a memory data structure. The memory data structure, in some examples, is a pattern space. The AI machine replaces manual entry steps of training with a machine-centric process including clustering in a pixel space, clustering in latent space and building the pattern space based on different losses derived from pixel space clustering and the latent space clustering.

Embodiments solve a retrieval problem of discovering an object among randomly generated patches.

Embodiments provided herein discover frequent objects in natural images as self-emergent structures from a small image set. Embodiments create a latent space of all patterns, a pattern space, which is a space of all possible sub-images from given image data. A distance structure in the pattern space captures the co-occurrence of patterns due to frequently appearing objects in image data (which may or may not be training data). A distance metric is learned by contrastive loss between geometrically perturbed patches, leading to a pattern embedding that learns both the patterns and pairwise distances among them. The learned distance structure serves as object memory, and the frequent objects are discovered by clustering a large number of randomly sampled patches at multiple positions and scales. The unsupervised approach of embodiments is a departure from existing supervised learning of object detection, where the detection model training needs to be informed of object presence in training images to be able to infer the presence of objects in unseen (and unlabeled) images.

Embodiments provide image representation based on local image patches and naturally provides a position and scale invariance property that is important to effective object detection. Embodiments successfully identify frequent objects such as human faces, human bodies, animals, or vehicles from relatively unorganized (objects are not centered or scale normalized) and small quantity of training images (1 to 200 images).

BRIEF DESCRIPTION OF THE DRAWINGS

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of embodiments provided herein.

DETAILED DESCRIPTION

Embodiments train an autoencoder 1-7 which includes an encoder 1-12 and a decoder 1-13. A result of the training is a learning of a pattern space 1-5. After the training, a data image 1-9 is processed by the encoder 1-12 and resulting latent vectors are clustered in the pattern space 1-5 to identify objects in the data image 1-9. In some embodiments, the data image 1-9 is annotated to provide image 1-17 which is then displayed on a display screen 1-19.

Figure 1A:
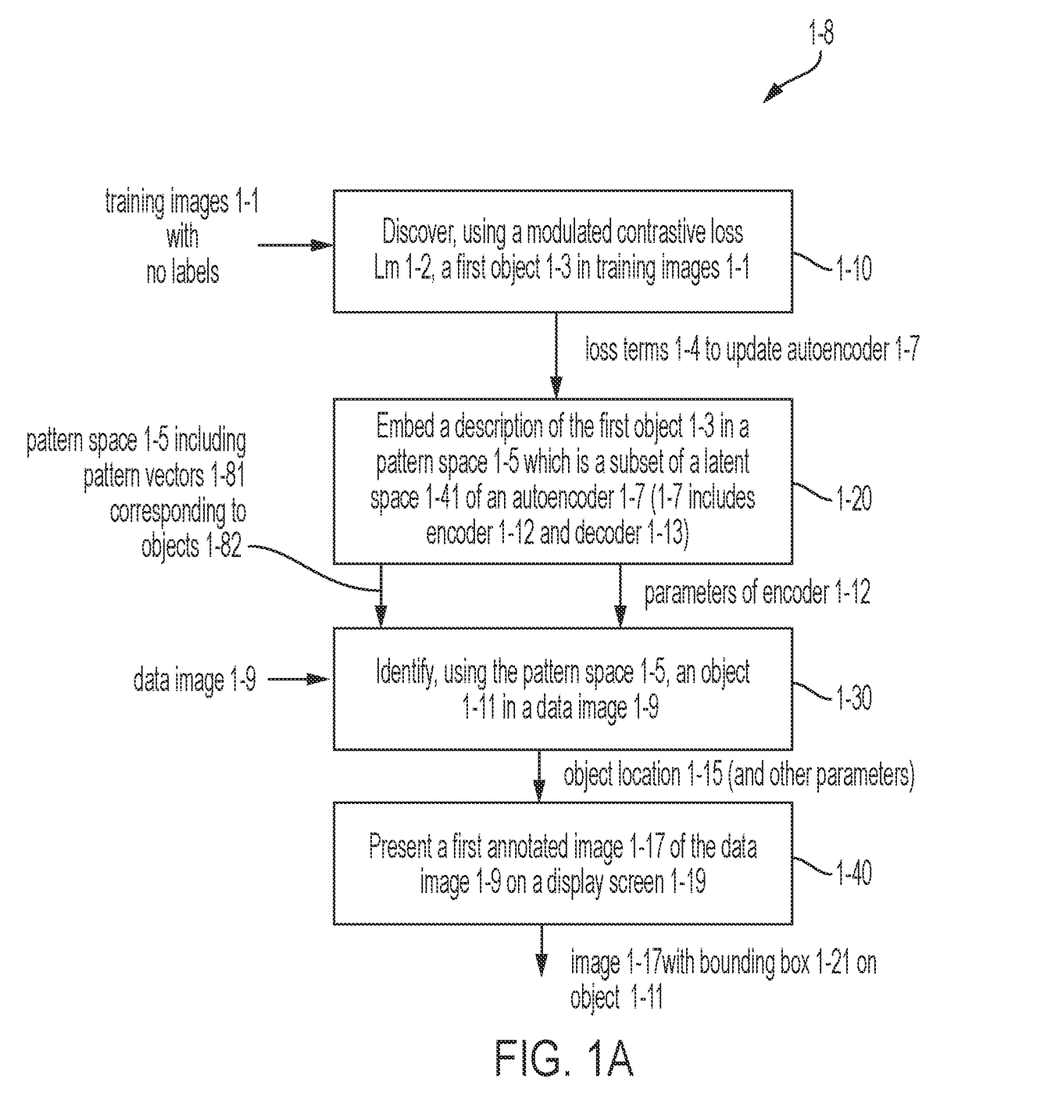
FIG. 1A illustrates a logic flow 1-8 for discovering objects in unlabeled training images 1-1 and processing a data image 1-9 to provide an image 1-17 which has been annotated with respect to discovered objects, according to some embodiments.
Figure 1B:
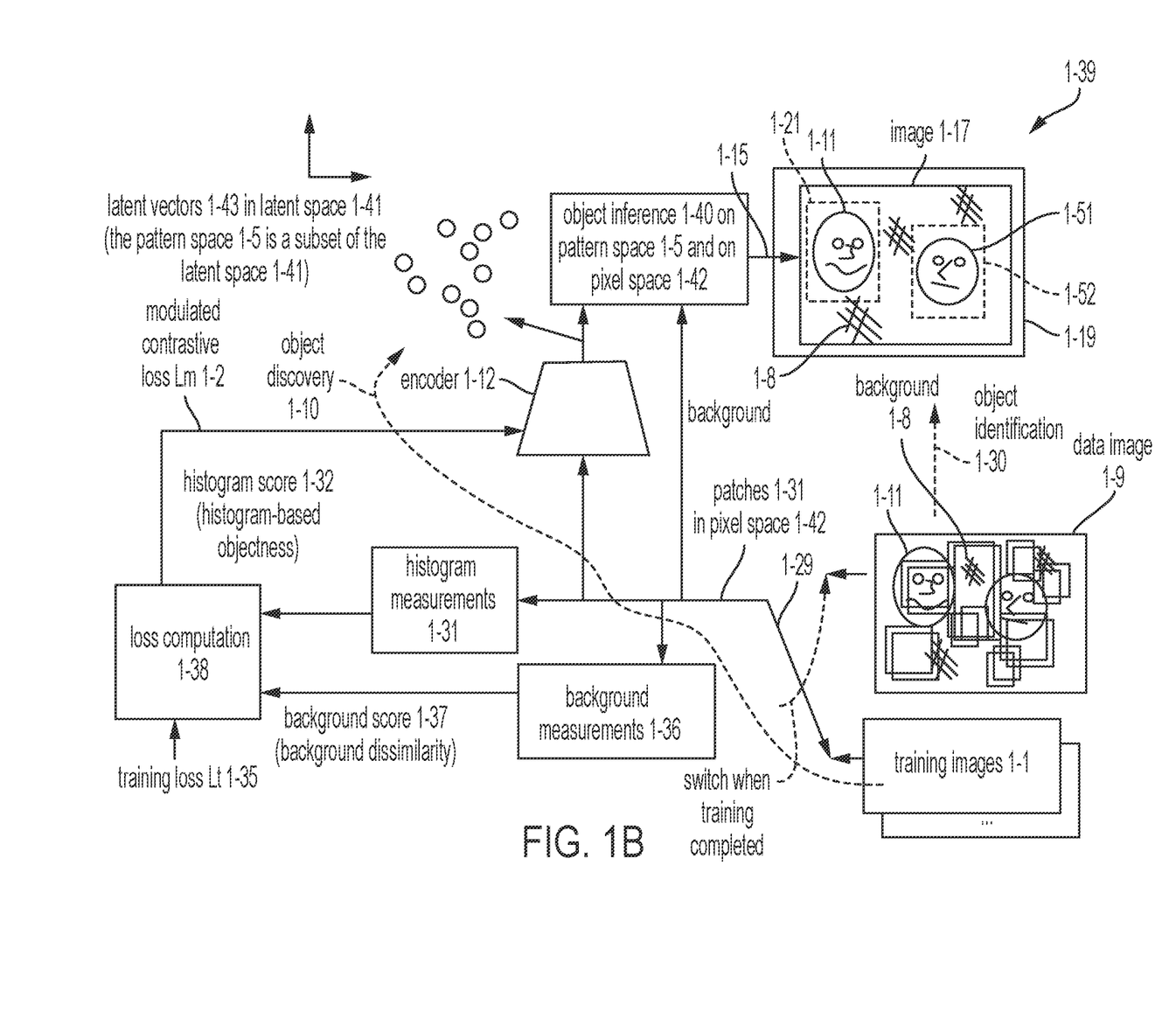
FIG. 1B illustrates a system 1-39 for discovering objects using patches 1-31 in unlabeled training images 1-1 to create a pattern space 1-5 and then processing the example data image 1-9 to provide the image 1-17 for display on a screen 1-19, according to some embodiments.
Figure 1C:
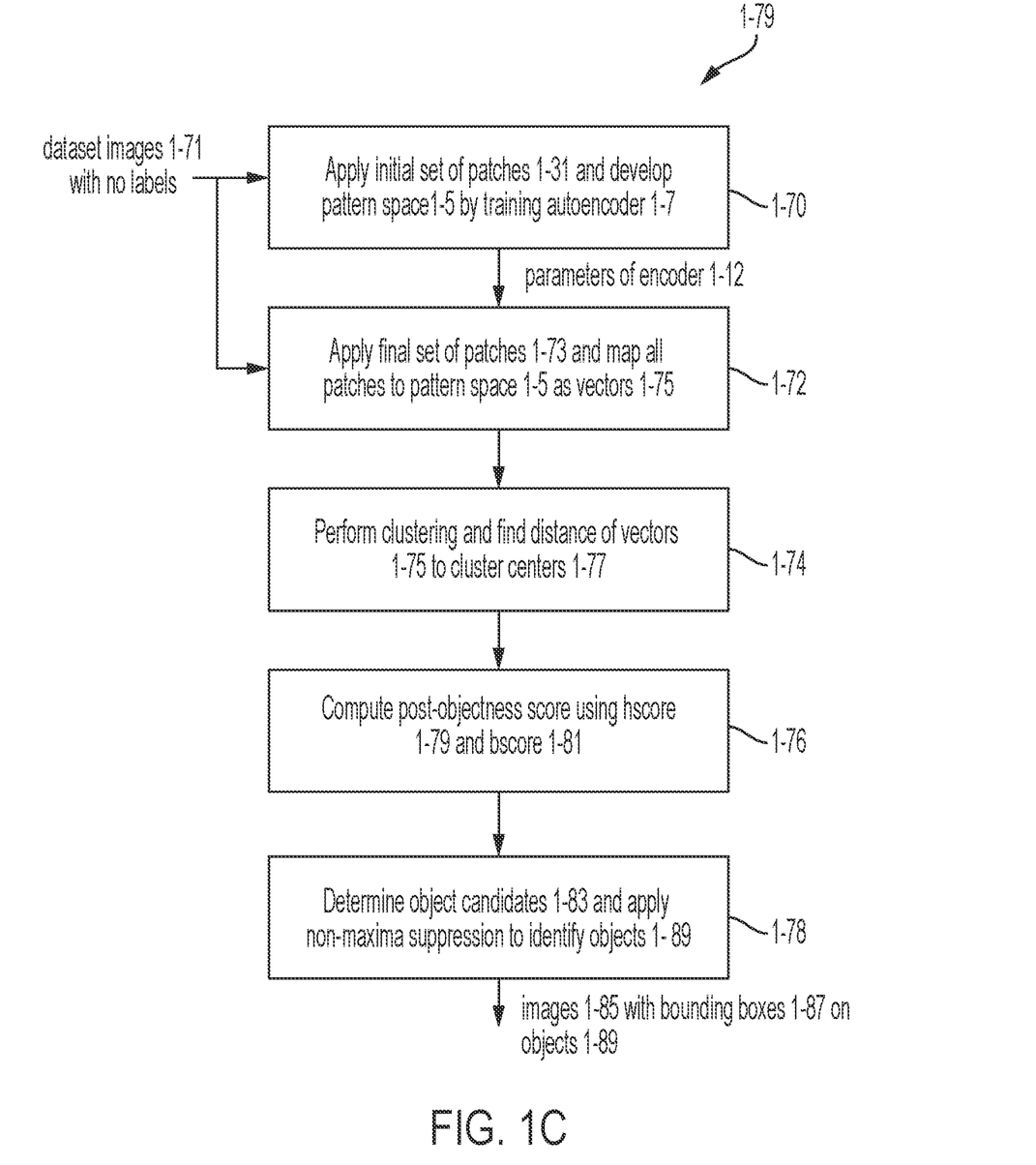
FIG. 1C illustrates exemplary logic 1-79 in which dataset images 1-71 are first processed to determine the pattern space 1-5 and then processed again to determine object candidates and finally determine objects in the dataset images 1-71, according to some embodiments.

In some embodiments, the same dataset is used for training of an encoder and for object identification (logic of FIG. 1C). In some embodiments, the encoder 1-12 is trained with training images, and then an unseen image is presented for object identification (logic of FIG. 1A). In both embodiments, the encoder 1-12 is trained in the same way.

FIG. 1A illustrates exemplary logic 1-8. At operation 1-10, training images 1-1 with no labels are processed to discover, using a modulated contrastive loss 1-2, a first object 1-3. Loss terms 1-4 are processed by operation 1-20 to embed a description of the first object 1-3 in the pattern space 1-5. The pattern space 1-5 is a subset of a latent space 1-41 of the autoencoder 1-7.

In some embodiments, after the training of the encoder 1-12, the training images 1-1 are input to the encoder 1-12 and pattern vectors 1-81 corresponding to objects 1-82 in the training images 1-1 are learned. Any response of the encoder 1-12 is referred to as a latent vector 1-43. The term representation in this context includes representation of images as a latent vector 1-43. A latent vector 1-43 which corresponds to an image containing an object is referred to as a pattern vector 1-81. Thus, the pattern space 1-5 consists of a subset of latent vectors referred to as pattern vectors The parameters of the encoder 1-12 (for example, weights 3-50 of FIG. 3B) and the pattern space are used to configure a computing device for inference. At operation 1-30, a data image 1-9 is processed with the encoder 1-12 and the pattern space 1-5 to obtain objection location 1-15 (and other parameters, such as aspect ratio and scale).

At operation 1-40, the data image 1-9 is annotated with a bounding box indicating the object 1-11 on the data image 1-9.

FIG. 1B illustrates an exemplary system 1-39 performing the logic 1-8 of FIG. 1A, with exemplary implementation details, according to some embodiments.

In the lower right of FIG. 1B, training images 1-1 are input through a logical switch 1-29. When training is completed, the switch 1-29 is moved to accept input of data images, for example, data image 1-9. In some embodiments, data image 1-9 is an image from the training images 1-1. In some embodiments, data image 1-9 is not an image from the training images 1-1.

Patches 1-31 in pixel space 1-42, obtained via the logical switch are processed at several different points in FIG. 1B. For example, patches 1-31 are processed by background measurements 1-36, histogram measurements 1-31, encoder 1-12 and object inference 1-40.

Histogram measurements 1-31 provide histogram score 1-32, which is a histogram-based objectness measure. Objectness is a heuristic indication of how likely a window placed on an image is to contain an object. Background measurements 1-36 provide background score 1-37 which is a measure of background dissimilarity. Loss computation 1-38 provides modulated contrastive loss 1-2 by operating on histogram score 1-32, background score 1-37 and training loss Lt 1-35 (see 3-13 of FIG. 3A for further details of training loss Lt 1-35).

The encoder 1-12 is trained using the modulated contrastive loss 1-2. Operation of the encoder 1-12 on patches 1-32 provides as an output latent vectors 1-43 in latent space 1-42. The pattern space 1-5 is a subset of the latent space 1-41.

Based on the modulated contrastive loss 1-2, object discovery 1-10 takes place (shown as a wavy dashed arrow in FIG. 1B).

When training over the training images 1-1 is completed, the logical switch 1-29 is positioned to accept input of data images, for example, data image 1-9 which contains object 1-11 (a human face, in this example). Random patches, occurring in pairs, are illustrated on data image 1-9 in FIG. 1B. The algorithm covers the image with random patches (more patches than shown in FIG. 1B). A tilted hash pattern as shown as background 1-8 in FIG. 1B. The representation is schematic. The background may be blue sky around an airplane, or green vegetation behind a group of people, or pavement behind an automobile, for example.

Patches 1-31 (as pertinent to data image 1-9) are processed by the autoencoder 1-12 and object inference 1-40. Histogram score 1-32 and background score 1-37 may also be used in object inference 1-40 (use of these scores for object inference 1-40 is not shown with drawing lines in FIG. 1B).

Object inference 1-40 provides annotation information 1-15 for the data image 1-9 so that bounding boxes may be placed on the data image 1-9 to create the image 1-17. The annotation information 1-15 includes, for example, bounding box location, bounding box aspect ratio, and bounding box scale. Thus, in the upper right of FIG. 1B, image 1-17 is created and displayed on a screen 1-19. In this example, two human faces (1-11 and 1-51) are identified based on the pattern space 1-5. 1-11 is marked with bounding box 1-21 and 1-51 is marked with bounding box 1-52.

As mentioned above, embodiments also include training the encoder 1-12 using a dataset and then, after the encoder 1-12 is trained, applying the encoder to the same dataset in order to make an identification of objects in the images of the dataset. The logic of this embodiment is provided in FIG. 1C.

In FIG. 1C, at operation 1-70, dataset images 1-71 with no labels are sampled into patches 1-32 and the pattern space 1-5 is developed training the autoencoder 1-7. The operations of operation 1-70 are the same as those of 1-10 and 1-20 in FIG. 1A and the related operations for training of FIG. 1B.

At operation 1-72, the dataset image 1-71 are sampled into a final set of patches 1-73 (the number of patches per image may be about 200) and the patches 1-73 are mapped by the encoder 1-12 to pattern space 1-5 as vectors 1-75.

At operation 1-74, clustering is performed and cluster centers 1-77 are found. The distance from each vector of the vectors 1-75 to the nearest cluster center is found. A low distance means that a vector may correspond to an object.

At operation 1-76, a post-objectness score is found using hscore 1-79 (see Eq. (1) below) and bscore 1-81 (see Eq. (2)).

Using a final score based on a sum of the distance from a cluster center, the hscore and the bscore, object candidates 1-83 are determined at operation 1-78 and non-maxima suppression is applied to identify objects 1-89, these are output with bounding boxes 1-87 as images 1-85 (labeled versions of dataset images 1-71). The sum may be a linear combination with weighting factors.

Figure 2:
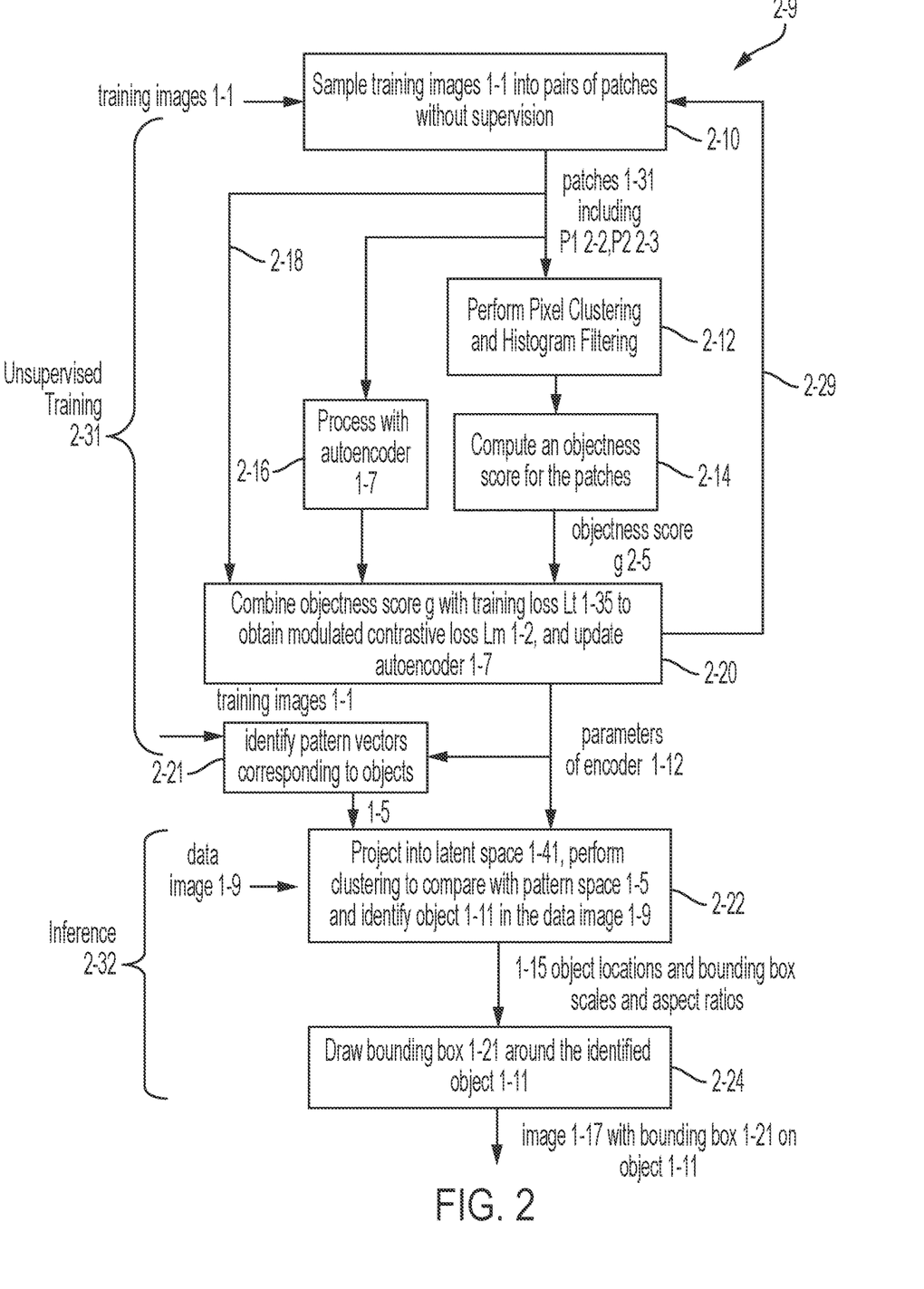
FIG. 2 illustrates a logic flow 2-9 performing unsupervised training 2-31 to determine the pattern space 1-5 and inference 2-32 to process the data image 1-9 to obtain the image 1-17 which has been annotated.

FIG. 2 illustrates exemplary logic 2-9 with additional non-limiting description of embodiments such as shown in FIGS. 1A and 1B. Logic 2-9 is divided into two portions, unsupervised training 2-31 followed by inference 2-32.

Operation 2-10 processes the training images 1-1 by sampling each training image into pairs of patches without supervision. The patches are referred to generally as patches 1-31. In an example, patches 1-31 includes pair of patches P1 2-2 and P2 2-3.

At operation 2-12, the patches 1-31 are processed by performing pixel clustering and histogram filtering. This is followed by computing an objectness score g 2-5 at operation 2-14. In parallel, the patches 1-31 are processed by autoencoder 1-7. At operation 2-20, the modulated contrastive loss 1-2 is obtained and the autoencoder 1-7 is updated. If training is not yet complete, path 2-29 returns the logic to operation 2-10. Completion of training may be determined by comparing one or more training losses with thresholds. Referring to FIG. 3B, described below, completion of training may be determined by monitoring all losses (e.g., losses Lkld 3-32, Lc 3-36, Lr 3-34, and/or Lm 1-2).

After the encoder 1-12 has been trained, the training images 1-1 are processed through the encoder 1-12 to quantify the pattern space 1-5 (operation 2-21).

When training is complete, inference 2-32 can be performed. At operation 2-22, the data image 1-9 is input to encoder 1-12 to obtain latent vectors which are compared with the pattern space 1-5 (operation 2-22). Based on sorting and threshold operations, object locations within the data image 1-9 are found. These are collected as item 1-15 (location, aspect ratio, scale). At operation 2-24, bounding box 1-21 is drawn around the identified object 1-11 and the data image 1-17 is output including the bounding box as an annotation.

Figure 3A:
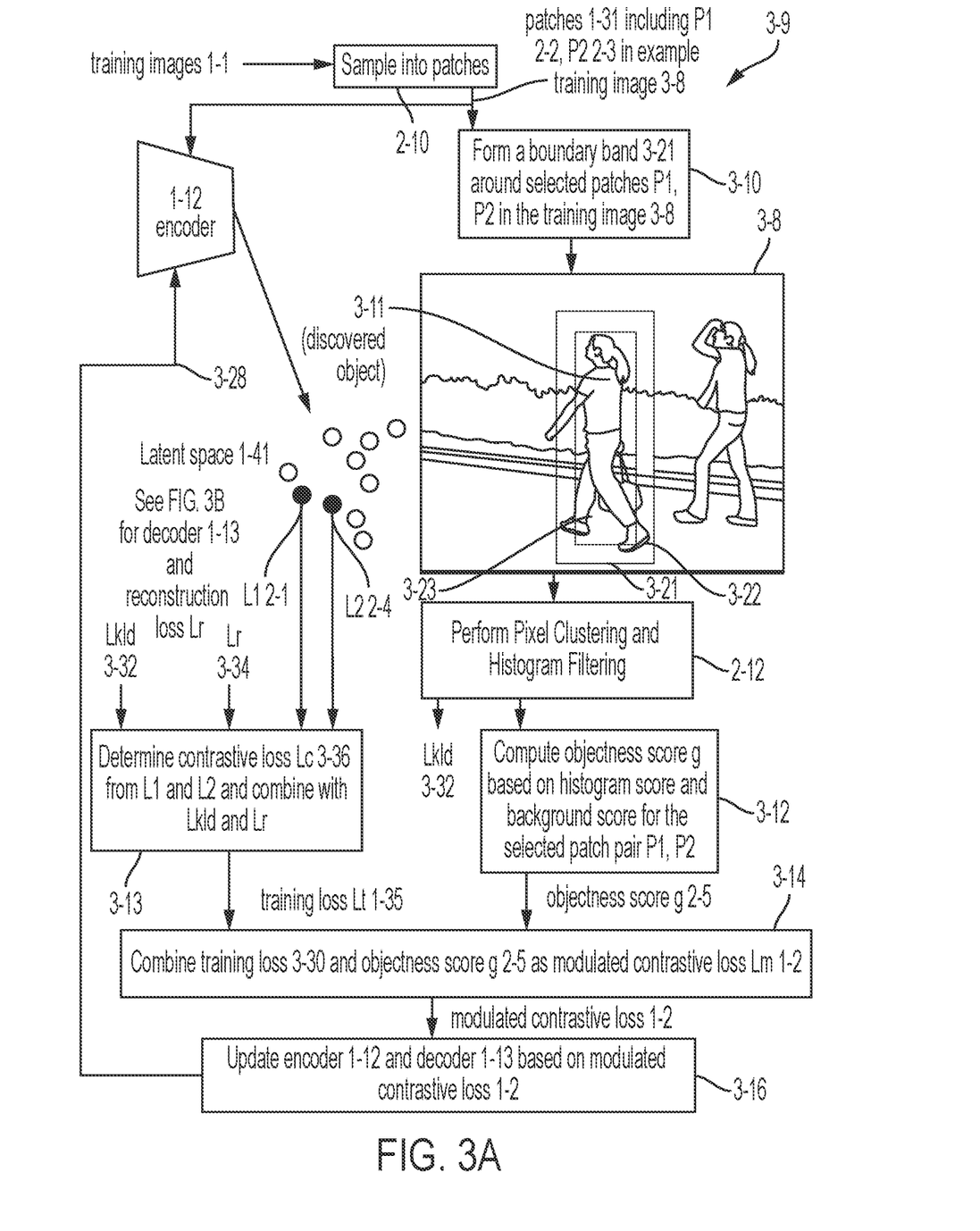
FIG. 3A illustrates a logic flow 3-9 with illustrations of loss variables used in training an encoder 1-12 and decoder 1-13, according to some embodiments.
Figure 3B:
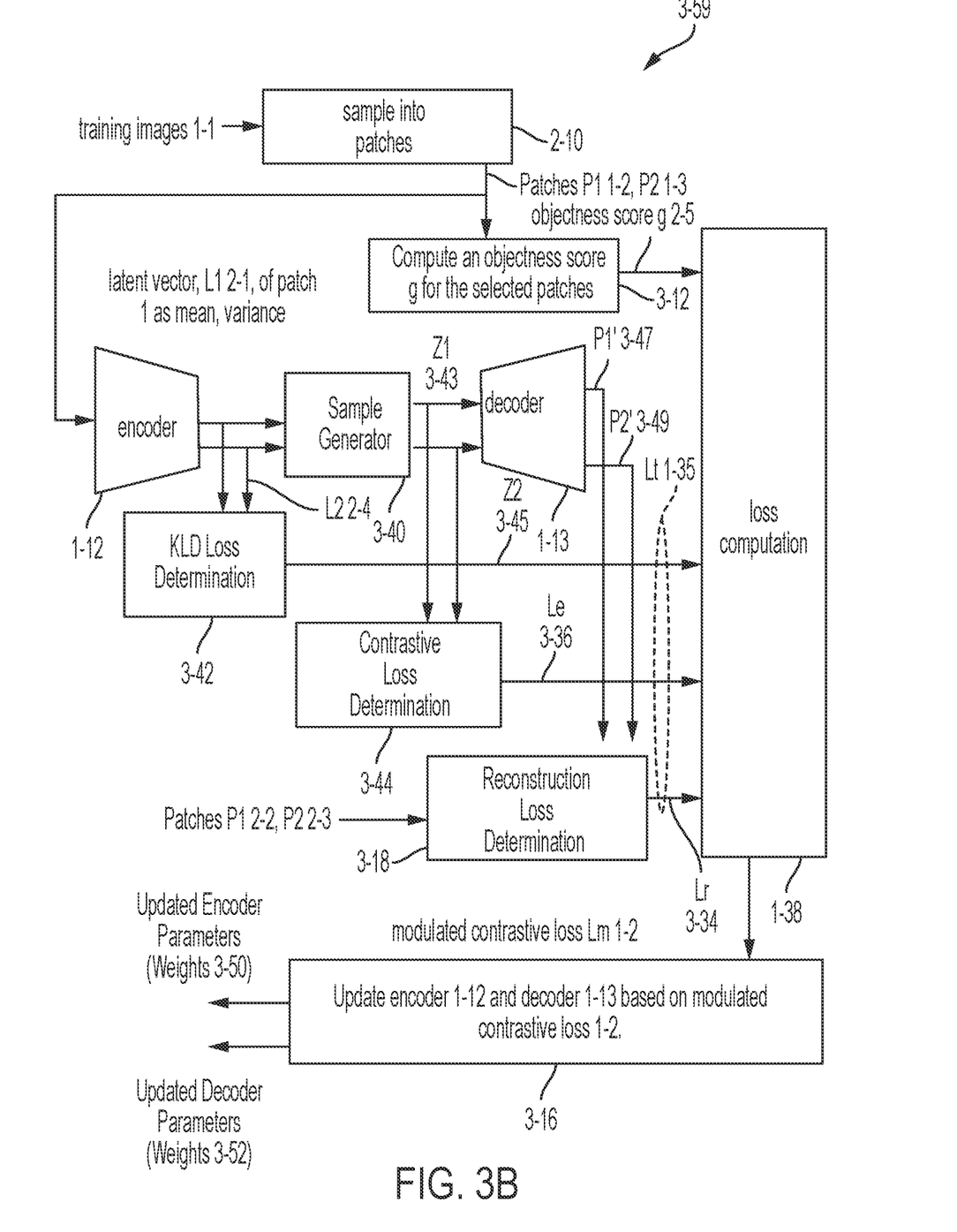
FIG. 3B illustrates a system 3-59 for training encoder weights 3-50 and decoder weights 3-52 using the loss variables of FIG. 3A, according to some embodiments.

FIG. 3A illustrates logic 3-9 with further non-limiting details of unsupervised training 2-31.

At operation 2-10, training images 1-1 are sampled into patches 1-31 including patches P1 2-2 and P2 2-3 in example training image 3-8. At operation 3-10, a boundary band 3-21 is formed around selected patches P1, P2 in the training image 3-8. An interior of the boundary band is 3-23 and area of the boundary band itself is 3-22 in FIG. 3A. As illustrated in the example of FIG. 3A, training image 3-8 includes a discovered object 3-11 (a person) associated with the patches P1 2-2 and P2 2-3. As an example, the interior of the boundary band may be either the patch P1 or P2, and the outer perimeter of the boundary band is a larger rectangle proportional to the area of P1 or P2. The larger rectangle captures background image data. In the example of FIG. 3A, the boundary band includes image data about foliage and pavement near the person indicated as object 3-11.

At 2-12, following 3-10, pixel clustering and histogram filtering are performed. A measure of probability density distance, Lkld 3-32 is obtained in operation 2-12.

At operation 3-12, an objectness score g 2-5 is formed based on the histogram score and the background score for the patches P1 2-2 and P2 2-3.

The operations 3-10, 3-12, 2-12 showing processing in pixel space of the example training image 3-8.

In parallel with the pixel space operations, some operations are performed in latent space 1-41. The patches 1-31 are put into the encoder 1-12 (which is being trained) and produce latent vectors marked as circles in FIG. 3A at the output of encoder 1-12 in the latent space 1-41. The latent vector corresponding to P1 is marked with a solid dot and label L1 2-1. The latent vector corresponding to P2 is marked with a solid dot and labeled L2 2-4.

At operation 3-13, Lkld 3-32, Lr 3-34 are combined with a contrastive loss Lc 3-36 to obtain training loss Lt 1-35. Lc 3-36 is obtained from L1 2-1 and L2 2-4. Lr 3-34 is obtained based on an output of the decoder 1-13 (see FIG. 3B).

At operation 3-4, the training loss Lt 1-35 and objectness score g 2-5 are then combined to form the modulated contrastive loss 1-2. Operation 3-16 uses the modulated contrastive loss 1-2 to update the encoder 1-12 and the decoder 1-13.

FIG. 3B illustrates further details related to the loss calculations for updating weights 3-50 of the encoder 1-12 and weights 3-52 of the decoder 1-13. Particularly shown in FIG. 3B are the variables downstream from the encoder 1-12. Details described in previous figures are not repeated in the following description.

Encoder 1-12 outputs latent vector L1 2-1 of patch P1 as a mean z and variance $\sigma_1^2$ (similarly L2 for patch P2). That is, in some embodiments, encoder 1-12 and decoder 1-13 form a variational auto encoder (VAE). Operation 3-42 performs a KLD (Kullback Leibler Divergence) loss determination. KLD distance is a well known measure; it is the distributional distance between the latent vector and a Gaussian distribution with a zero mean and unit variance: $KLD_j=(1+\ln(\sigma_j^2))-z_j^2-\sigma_j^2$ where j=1 for L1 2-1 and j=2 for L2 2-4. Lkld 3-32 is then the average, that is, 0.5 ($KLD_1+KLD_2$).

The statistics (L1, L2) from encoder 1-12 feed the sample generator 3-40 which provides sample vectors Z1 3-43 and Z2 3-45 which are used by contrastive loss determination 3-44 to produce Lc 3-36. The sample vectors Z1 and Z2 are decoded by decoder 1-13 to produce reconstructed patches P1' 3-47 and P2' 3-49 which are compared with patches P1 2-2 and P2 2-3 at the reconstruction loss determination 3-18 producing reconstruction loss Lr 3-34. As for the KLD distance (Lkld 3-32), Lr 3-34 is based on one loss for each patch P1 2-2 and P2 2-3; the losses are then averaged.

Loss computation 1-38 combines the objectness score g 2-5 and the training loss Lt 1-35 to produce the modulated contrastive loss 1-2.

Exemplary histogram calculations (also referred to as histogram filtering) use histogram differences, and expectations related to samples of patches. The hscore(P) of a patch P is the histogram difference between its inner rectangle PI and its outer band PO. The distance may be a Hellinger distance. Hscore(P) may include an additional term which amplifies effect of modulation.

$$h\text{score}(P) = D\text{Hellinger}(h(PI),h(PO)) - k*E(D\text{Hellinger}(h(qI),h(qO)), \quad \text{Eq (1)}$$

where h(q) is the 2D histogram of the patch q, E is expectation, Q is a collection of all sampled patches, and q ranges over qI in union with qO for q in Q. In an example, k has a value of 0.5. Equation (1) is an example of a histogram measurement 1-31.

Exemplary background calculations use clustering and distances. Patches are flattened into vectors and K-means algorithm identifies cluster centers as typical background patterns. The cluster centers are stored for measuring the bscore(P) (background similarity score) of any sampled patch P.

$$b\text{score}(P) = \min_i \|\text{vec}(P) - ci\| \quad \text{Eq (2)}$$

The bscore may be normalized by its maximum score over all sampled patches Q. Equation 2 is an example of a background measurement 1-36.

The combination of both the hscore and the bscore may be used as the objectness score, g, to modulate the contrastive loss, Lc.

$$g = k_1 h\text{score}(P1,P2) * k_2 b\text{score}(P1,P2) \quad \text{Eq (3)}$$

The value of g from Eq (3) may be applied to find Lm.

$$Lm = (k_1 h\text{score}(P1,P2) * k_2 b\text{score}(P1,P2))*Lc \quad \text{Eq (4)}$$

In some embodiments, modulated contrastive loss Lm 1-2 may be determined by 1-38 as a combination of the training loss 1-36 and the objectness score g in several manners. Equations 5-7 provide exemplary combinations to determine Lm, and Equation 5 is an exemplary combination to determine Lt, according to some embodiments.

$$Lm = g*Lt \quad \text{Eq (5)}$$

$$Lm = \alpha*g + \beta*Lt \quad \text{Eq (6)}$$

$$Lm = \max(g, \gamma*Lt) \quad \text{Eq (7)}$$

$$Lt = \delta_1*Lkld + \delta_2*Lc + \delta_3*Lr \quad \text{Eq (8)}$$

In which $\alpha$, $\beta$, $\gamma$, $\delta_1$, $\delta_2$, and $\delta_3$ are weighting constants determined using, for example, the measure Lr or another approach as familiar to one of ordinary skill in image processing. The operations above are: "*" is scalar multiplication, "+" is scalar addition, and "max(a,b)" returns a if a>b, otherwise b is returned.

Gradient descent, for example, is then used at 3-16 with the modulated contrastive loss Lm 1-2 as input at 3-16 to provide updated encoder parameters as weights 3-50 and updated decoder parameters as weights 3-52.

Figure 4:
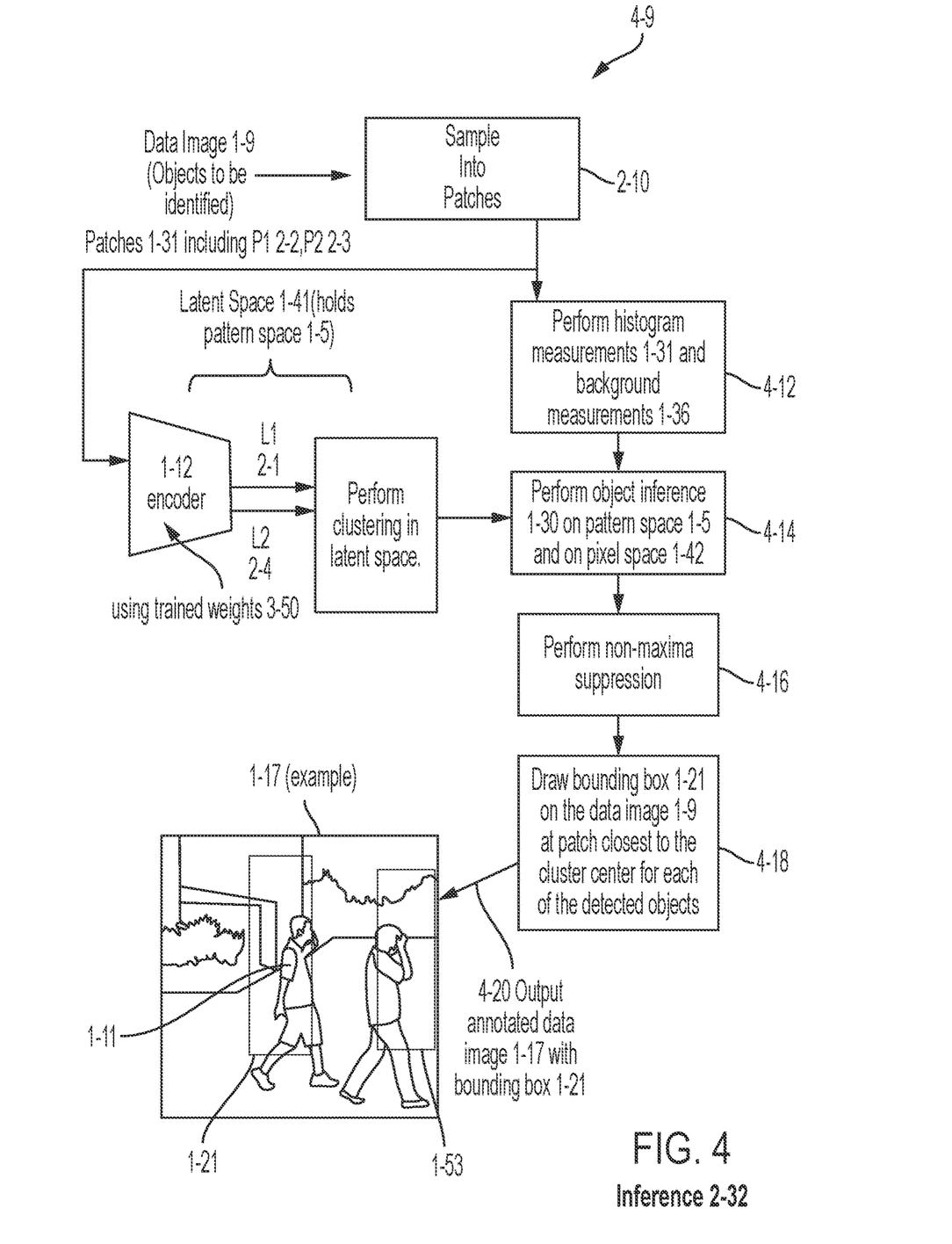
FIG. 4 illustrates a system 4-9 for performing inference of objects in a data image 1-9 and providing an image 1-17 which is annotated with previously-discovered objects.

FIG. 4, illustrating exemplary logic 4-9, provides further details of inference 2-32.

A data image 1-9 is processed by operation 2-10 to obtain patches 1-31, including P1 2-2 and P2 2-3. Latent space and pixel space calculations are performed. Specifically, latent vectors L1 2-1 and L2 2-4 are obtained and clustering is performed at operation 4-10. Operation 4-12 performs histogram measurements 1-31 and background measurements 1-36 on patches 1-31 from the data image 1-9.

Operation 4-14 determines object candidates in the data image 1-9 using Eq. 9. Eq. 9 depends on both the latent space (Lscore) and the pixel space (hscore and bscore) as shown below.

The trained pattern space embedding maps the patches 1-31 of data image 1-9 into the pattern space 1-5, as mentioned above. 1-mean clustering ("one mean clustering") determines clusters and cluster centers at operation 4-10. In some embodiments, K-mean clustering with K>2 is used, and then one cluster center is selected out of K cluster centers.

The distance of each patch, in the latent space, from the closest cluster center is Lscore.

$$Lf = L\text{score} + \alpha_h*(1-h\text{score}) + \alpha_b*(1-b\text{score}) \quad \text{Eq (9)}$$

A low score is associated with objects.

Ncandidate candidates are retained. As an example, Ncandidate=20.

Non-maxima suppression is applied at 4-16 to eliminate strong scores which are reflective of the same object, one of the scores being retained (the maximum).

Npredict objects are retained. In an example, Npredict=5.

The discovery and identification of objects as described above (particularly Eq (1)-Eq (9) and the logic of FIG. 1C) has been tested on the INRIA-EX data set (see domain name pascal.inrialpes.fr/data/human), the Penn-Fudan dataset (see domain name www.cis.upenn.edu/~ish), and the FDDB data set (see domain name vis-www.cs.umass.edu/fddb). The F1 score using the contrastive loss Lm 1-2 augmented with background and histogram scores in sample evaluations for these data sets is superior to that for contrastive loss alone (Lc) and superior to contrastive loss augmented with background and histogram scores.

For the logic of FIG. 1C, two different performance metrics for measuring the success of object discovery. For evaluating single-object discovery, embodiments use correct localization (CorLoc) defined as the percentage of images that our model correctly localized at least one target object. The localization accuracy is measured by the common IoU (intersection over union) measure, and IoU over 0.5 is generally regarded as success herein For measuring accuracy of multi-object discovery, traditional detection metrics based on Precision and Recall scores also apply. In supervised learning scenarios, the detection scores are estimated from the ground truth presence/absence of objects in each image and at each positions ('anchor points' or per local proposals) so that they provide a measure of decision consistency over different images and positions in each image. On the other hand, embodiments (unsupervised learning of the embodiments) measure object presence based on cluster distance and lack the same consistency and do not interpret directly as a detection score. Thus, embodiments use F1 score for combining recall and precision for our evaluation. F1 score is developed for measuring the success of information retrieval, and our application of finding an object among randomly generated patches can be regarded as a retrieval problem. Because embodiments control the number of maximum predictions per image, embodiments identify the maximum of F1 scores over a range of maximum predictions (from 1 to 5).

Similar reasoning to that above for unsupervised learning and decision metrics and FIG. 1C also for the logic of FIGS. 1A and 1B.

Figure 5:
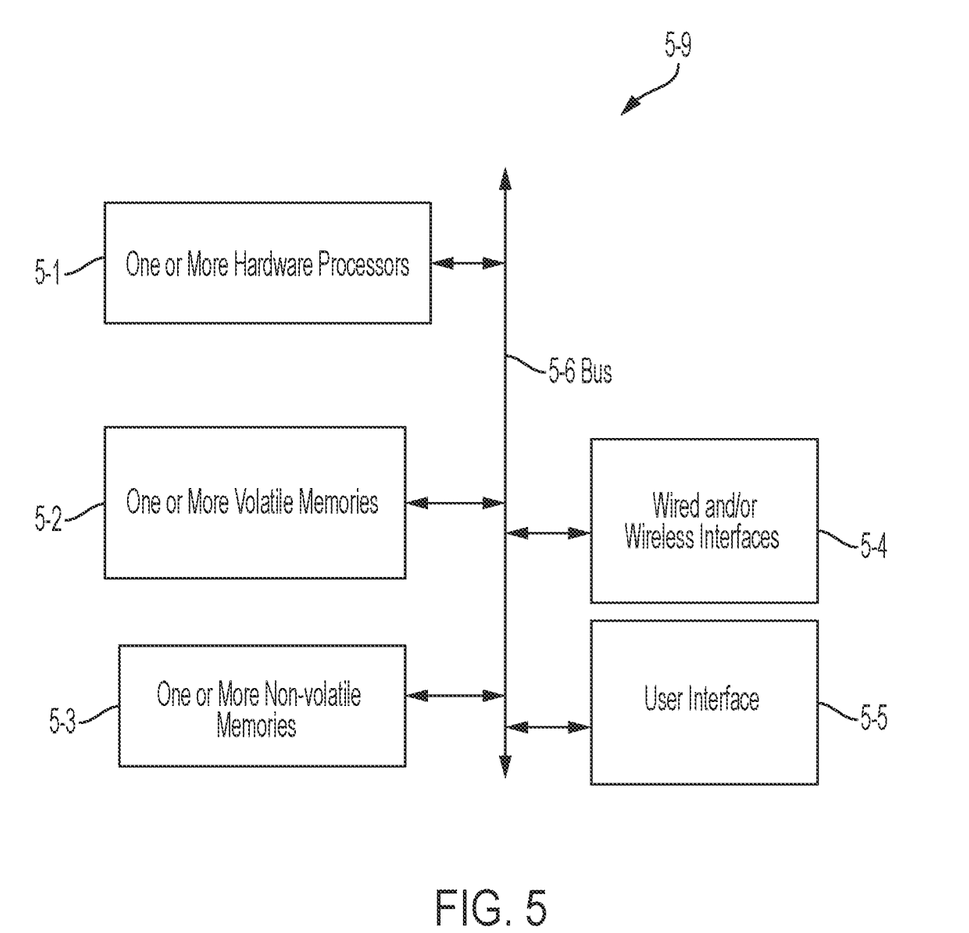
FIG. 5 illustrates an apparatus for implementing one or more of the embodiments, for example one or more of the components of FIG. 1B, 3B or 4, according to some embodiments.

FIG. 5 illustrates an exemplary apparatus 5-1 for implementation of the embodiments disclosed herein. The apparatus 5-1 may be a server, a computer, a laptop computer, a handheld device, or a tablet computer device, for example. Apparatus 5-1 may include one or more hardware processors 5-2. The one or more hardware processors may include an ASIC (application specific integrated circuit), CPU (for example CISC or RISC device), and/or custom hardware. Apparatus 5-1 also may include a user interface 5-5 (for example a display screen and/or keyboard and/or pointing device such as a mouse). Apparatus 5-1 may include one or more volatile memories 5-2 and one or more non-volatile memories 5-3. The one or more non-volatile memories 5-3 may include a non-transitory computer readable medium storing instructions for execution by the one or more hardware processors 5-1 to cause apparatus 5-1 to perform any of the methods of embodiments disclosed herein.

What is claimed is:

1. A method comprising:
   discovering, using a modulated contrastive loss, a first object in a plurality of training images, wherein the plurality of training images includes a first training image;
   embedding a description of the first object in a pattern space, wherein the pattern space is a subset of a latent space of an autoencoder;
   identifying, using the pattern space, a second object in a first data image, wherein a second plurality of images includes the first data image; and
   presenting a first annotated image of the first data image on a display screen, wherein a first bounding box of the first annotated image is associated with a first pattern vector in the pattern space,
   wherein the modulated contrastive loss is in the form of an objectness score multiplied by a contrastive loss value, the objectness score is based on a combination of a histogram score with a background score, the background score is a distance from the first pattern vector to a background cluster center, and the background cluster center is found using a K-means algorithm applied to pairs of patches from the plurality of training images.

2. The method of claim 1, further comprising:
training the autoencoder using the modulated contrastive loss.

3. The method of claim 1, further comprising:
sampling a pixel space of the first training image using a plurality of pairs of patches;
inputting a first pair of patches to the autoencoder to obtain a first pair of latent vectors, wherein the plurality of pairs of patches includes the first pair of patches; and
determining the contrastive loss value based on the first pair of latent vectors.

4. The method of claim 3, further comprising:
forming, in the pixel space, the objectness score based on the first pair of patches, wherein the objectness score includes a histogram-based component with respect to the first pair of patches;
forming a first cluster associated with the plurality of pairs of patches in the pixel space of the first training image; and
calculating the background score based on the first cluster, wherein the background score is an indication of similarity between a background and a foreground of the first training image.

5. The method of claim 1, wherein the objectness score is based on a product of the histogram score and the background score.

6. The method of claim 1, further comprising:
after a completion of a training of the autoencoder:
inputting a second plurality of images into an encoder to obtain a plurality of latent vectors, wherein the autoencoder includes the encoder;
forming, based on the plurality of latent vectors, a plurality of clusters in the latent space including a first cluster and a second cluster;
performing a non-maxima suppression computation with respect to the first cluster and the second cluster; and
identifying, based on the non-maxima suppression computation, a first cluster center of the first cluster as a first point in the pattern space, wherein the first cluster center corresponds to the first pattern vector.

7. The method of claim 1, further comprising:
after a completion of a training of the autoencoder:
inputting the plurality of training images into an encoder, wherein the autoencoder includes the encoder;
forming a plurality of clusters in the latent space;
identifying a first cluster center of a first cluster of the plurality of clusters as a first point in the pattern space, wherein the first cluster center corresponds to the first pattern vector.

8. The method of claim 7, further comprising:
identifying a second cluster center of a second cluster of the plurality of clusters as a second point in the pattern space, wherein the second cluster center corresponds to a second pattern vector.

9. The method of claim 8, wherein the first pattern vector corresponds to a full image of a human face.

10. The method of claim 8, wherein the first pattern vector corresponds to a full-length view of a person.

11. The method of claim 1, further comprising:
after a completion of a training of the autoencoder:
input the second plurality of images into an encoder, wherein the autoencoder includes the encoder;
form a plurality of clusters in the latent space;
identify a first cluster center of a first cluster of the plurality of clusters as a first point in the pattern space, wherein the first cluster center corresponds to the first pattern vector.

12. A method comprising:
discovering, using a modulated contrastive loss, a first object in a plurality of training images, wherein the plurality of training images includes a first training image;
embedding a description of the first object in a pattern space, wherein the pattern space is a subset of a latent space of an autoencoder;
identifying, using the pattern space, a second object in a first data image, wherein a second plurality of images includes the first data image; and
presenting a first annotated image of the first data image on a display screen, wherein a first bounding box of the first annotated image is associated with a first pattern vector in the pattern space,
the method further comprising:
sampling a pixel space of the first data image using a plurality of pairs of patches;
computing a first score of a first pair of patches, wherein the plurality of pairs of patches includes the first pair of patches;
forming, in the latent space associated with the autoencoder, a first cluster associated with the plurality of pairs of patches of the first data image;
determining a first distance in the latent space of the first pair of patches from a center of the first cluster;
determining the first score as the first distance modified by a histogram score in the pixel space and a background distance score in the pixel space, wherein:
the lower the first score, the more likely an object is present,
the higher the histogram score, the more likely the object is present, and
the higher the background distance score, the more likely the object is present;
determining that the first score exceeds a threshold; and
associating the first pattern vector with the center of the first cluster.

13. A server comprising:
one or more memories; and
one or more processors,
the one or more processors configured to access a computer program stored as a plurality of instructions in the one or more memories, wherein the computer program is configured to cause the one or more processors to:
discover, using a modulated contrastive loss, a first object in a plurality of training images;
embed a description of the first object in a pattern space, wherein the pattern space is a subset of a latent space of an autoencoder;
identify, using the pattern space, a second object in a first data image, wherein a second plurality of images includes the first data image; and
present a first annotated image of the first data image on a display screen, wherein a first bounding box of the first annotated image is associated with a first pattern vector in the pattern space, wherein the modulated contrastive loss is in the form of an objectness score multiplied by a contrastive loss value, the objectness score is based on a combination of a histogram score with a background score, the background score is a distance from the first pattern vector to a background cluster center, and the background cluster center is found using a K-means algorithm applied to pairs of patches from the plurality of training images.

14. The server of claim 13, wherein the computer program is further configured to cause the one or more processors to:
train the autoencoder using the modulated contrastive loss.

15. The server of claim 14, wherein the computer program is further configured to cause the one or more processors to:
sample a pixel space of a first training image of the plurality of training images using a plurality of pairs of patches;
input a first pair of patches to the autoencoder to obtain a first pair of latent vectors, wherein the plurality of pairs of patches includes the first pair of patches; and
determine the contrastive loss value based on the first pair of latent vectors.

16. The server of claim 15, wherein the computer program is further configured to cause the one or more processors to:
form, in the pixel space, the objectness score based on the first pair of patches, wherein the objectness score includes a histogram-based component with respect to the first pair of patches;
form a first cluster associated with the plurality of pairs of patches in the pixel space of the first training image; and
calculate the background score based on the first cluster, wherein the background score is an indication of similarity between a background and a foreground of the first training image.

17. The server of claim 13, wherein the objectness score is based on a product of the histogram score and the background score.

18. The server of claim 13, wherein the computer program is further configured to cause the one or more processors to:
after a completion of a training of the autoencoder:
input the second plurality of images into an encoder to obtain a plurality of latent vectors, wherein the autoencoder includes the encoder;
form, based on the plurality of latent vectors, a plurality of clusters in the latent space including a first cluster and a second cluster;
perform a non-maxima suppression computation with respect to the first cluster and the second cluster; and
identify, based on the non-maxima suppression computation, a first cluster center of the first cluster as a first point in the pattern space, wherein the first cluster center corresponds to the first pattern vector.

19. A non-transitory computer readable medium storing instructions, the instructions configured to cause one or more apparatuses to perform a method comprising:
discovering, using a modulated contrastive loss, a first object in a plurality of training images;
embedding a description of the first object in a pattern space, wherein the pattern space is a subset of a latent space of an autoencoder;
identifying, using the pattern space, a second object in a first data image; and
presenting a first annotated image of the first data image on a display screen, wherein a first bounding box of the first annotated image is associated with a first pattern vector in the pattern space,
wherein the modulated contrastive loss is in the form of an objectness score multiplied by a contrastive loss value, the objectness score is based on a combination of a histogram score with a background score, the background score is a distance from the first pattern vector to a background cluster center, and the background cluster center is found using a K-means algorithm applied to pairs of patches from the one or more training images.

20. A server comprising:
one or more memories; and
one or more processors,
the one or more processors configured to access a computer program stored as a plurality of instructions in the one or more memories, wherein the computer program is configured to cause the one or more processors to:
train, using an initial set of patches applied to one or more images in a dataset and using a modulated contrastive loss, a pattern space, wherein the pattern space is a subset of a latent space of an autoencoder;
identify, using a final set of patches applied to the one or more images and using the pattern space, an object in a first image of the one or more images; and
present an annotated image of the first image on a display screen, wherein a bounding box of the annotated image is associated with a first pattern vector in the pattern space and associated with the object,
wherein the modulated contrastive loss is in the form of an objectness score multiplied by a contrastive loss value, the objectness score is based on a combination of a histogram score with a background score, the background score is a distance from the first pattern vector to a background cluster center, and the background cluster center is found using a K-means algorithm applied to pairs of patches from the one or more training images.

21. The server of claim 20, wherein a number of the one or more images is only one image.

22. The server of claim 20, wherein a number of the one or more images is in a range from one to two hundred images.

* * * * *